April 3, 1962 M. A. BECK ET AL 3,028,131
VACUUM CUP
Filed April 4, 1960

INVENTORS
MARTIN A. BECK and
RICHARD W. KAUFFMAN
BY Oscar H. Spencer
ATTORNEY

United States Patent Office

3,028,131
Patented Apr. 3, 1962

3,028,131
VACUUM CUP
Martin A. Beck, Cumberland, Md., and Richard W. Kauffman, Fort Ashby, W. Va., assignors to Pittsburgh Plate Glass Company, Allegheny County, Pa., a corporation of Pennsylvania
Filed Apr. 4, 1960, Ser. No. 19,910
7 Claims. (Cl. 248—14)

This invention relates to a vacuum cup and more especially relates to a vacuum cup which is to be used to engage a carriage to a moving glass sheet or continuous glass ribbon.

To cut a moving glass sheet or a moving continuous glass ribbon along a line normal to the direction of travel of the moving sheet or ribbon, there has been developed a cutting apparatus which includes a carriage mounted for movement in the direction of travel of the moving sheet or ribbon. The carriage supports a set of vacuum cups that are moved downwardly into engagement with the sheet or ribbon so that the carriage is moved by the sheet or ribbon. The apparatus further includes a glass cutter assembly which has a glass cutter wheel for scoring the glass sheet or ribbon. The glass cutter assembly is moved transversely across the glass when the vacuum cups are engaging the glass to move the carriage with the glass sheet or ribbon. This apparatus is disclosed and claimed in assignee's copending patent application Serial No. 787,510, entitled "Glass Cutting Apparatus" and filed by Charles O. Huffman et al. on January 19, 1959.

The vacuum cups are disposed relative to one another transversely of the direction of travel of the carriage afforded by the glass sheet or ribbon. The carriage supports a shaft for rotation about its axis which is disposed transversely of the direction of travel of the carriage. Arms are keyed on the shaft and the free ends of the arms are bifurcated. Each vacuum cup has a horizontal rigid or metal plate. A connecting lug is mounted on each plate. The lug has a horizontal aperture. The lug is supported by a pin extending through the horizontal aperture and through the bifurcated end of one of the arms keyed on the shaft. Each plate is thus supported by the shaft and the rotation of the latter results in either lowering or raising of the plate.

The plate is a part of a vacuum cup which also includes a rubber ring. The ring is partially inset in a circular groove in the bottom face of the plate. The groove has side walls diverging toward its base. The portion of the rubber ring in the groove has similar diverging side walls so that the rubber ring is wedged in the circular groove in the plate. The rubber ring is cemented in position.

The vacuum cups are lowered each time that a transverse cut is to be produced in the glass sheet or ribbon. The apparatus operates automatically for programmed cutting. It is operated around the clock and thus the vacuum cups are brought down into engagement with the glass many times in a 24-hour period.

Each time that the vacuum cups are lowered onto the glass the cups are subjected to shear forces that have a tendency to rip the rubber ring from the plate. Although the apparatus included a device to accelerate the carriage from a stationary position to a speed approximately that of the moving glass sheet or ribbon before the vacuum cups are lowered, there is some difference between the speed of the carriage and that of the moving sheet or ribbon when the cups are lowered.

The apparatus includes air cylinders which are connected to the supporting structure and which have their piston rods connected to the carriage. The air feed to these air cylinders is theoretically adjusted so that the glass sheet or ribbon does not provide through the connection between the vacuum cups and the glass sheet or ribbon all of the force needed to move the carriage. However, when these air cylinders are not operating properly, additional shear forces are created on the rubber rings during the engagement of the vacuum cups with the moving glass.

It is an object of the present invention to provide a vacuum cup which has improved resistance to damage by shear forces.

It is another object of the present invention to provide a vacuum cup having a flexible cup component which can be quickly and easily replaced.

These and other objects of the present invention will be apparent to one skilled in the art from the following description of a preferred embodiment of the vacuum cup of this invention when taken in conjunction with the drawings in which similar parts are designated by the same numeral and in which.

Figure 1:
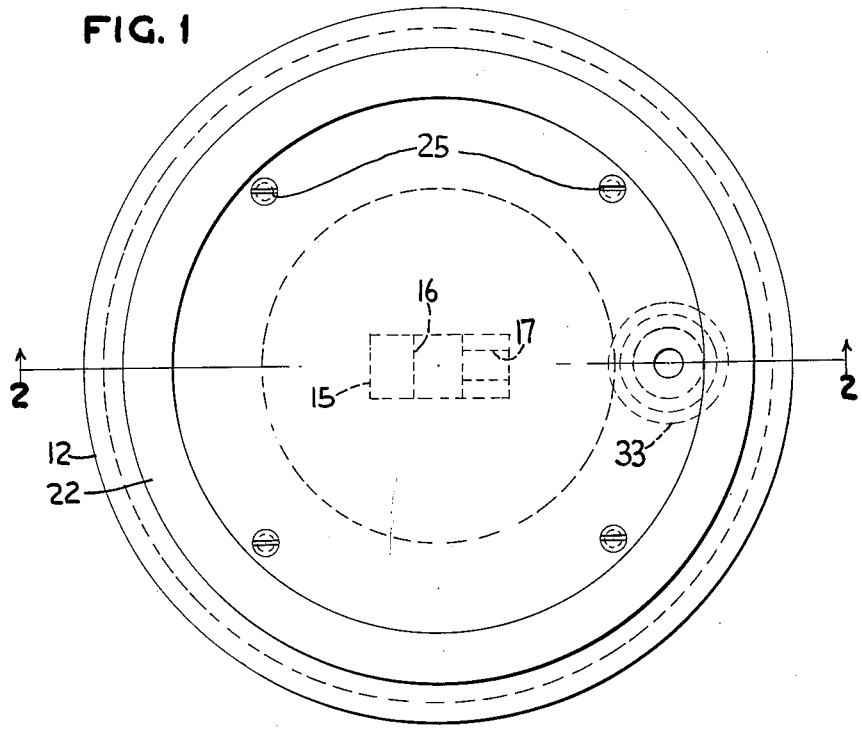
FIG. 1 is a plan of the vacuum cup.
Figure 2:
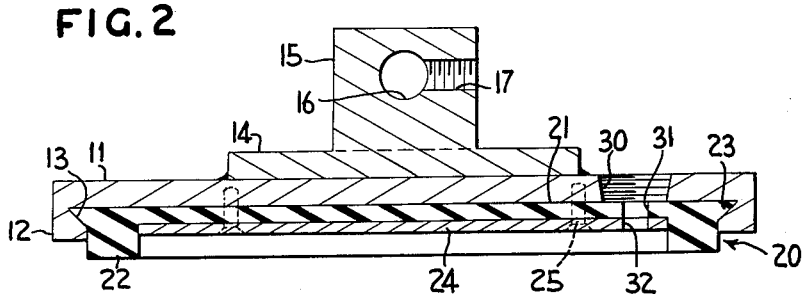
FIG. 2 is a cross section taken along line 2—2 of FIG. 1.

The vacuum cup has a rigid or metal circular plate 11 which has a peripheral forwardly extending flange 12. The peripheral flange 12 has its inner wall recessed adjacent to plate 11 to provide a tapered groove between flange 12 and plate 11. A plate 14, which is welded on plate 11, has an integral rearwardly extending lug 15. A cylindrical aperture 16 and a cylindrical threaded aperture 17 are in lug 15. The axes of apertures 16 and 17 are normal to each other and are parallel to plate 11. A set screw (not shown) can be placed in aperture 17 to engage a pin (not shown) in aperture 16. The pin would extend through a bifurcated end of an arm keyed on a shaft as described above in connection with the glass cutting apparatus.

A cup generally indicated at 20 is made of a flexible material such as rubber. The cup 20 has a disc portion 21 and a peripheral forwardly extending flange 22. The flange 22 extends normal to disc portion 21 of cup 20. The cup 20 has a peripheral lip 23 which extends laterally from disc portion 21. The lip 23 is tapered so that it has a shape corresponding to groove 13 in flange 12 of plate 11. The cup 20 is positioned with its rear face against plate 11 so that lip 23 is in groove 13 of flange 12.

A rigid or metal plate 24 is placed against the front face of disc portion 21 of cup 20. Screws 25 mount plate 24 on plate 11 with disc portion 21 of cup 20 between plates 11 and 24.

The plate 11, disc portion 21 of cup 20 and plate 24 have aligned apertures 30, 31 and 32, respectively. The aperture 30 in plate 11 is threaded to receive a hose (not shown) which is connected to a vacuum source (not shown) through a valve (not shown). The valve determines whether or not these apertures 30, 31 and 32 are in communication with the vacuum source or with the atmosphere.

The cup 20 has on its rear face and abutting plate 11 an annular rib or ridge 33. The plate 24 by screws 25 holds cup 20 tightly against plate 11 so that rib 33 is compressed. The rib 33 is present to prevent loss of vacuum that would occur through ingress of air between flange 12 and flange 22, between flange 12 and lip 23 and between portion 21 of cup 20 and plate 11.

In the preferred embodiment plate 11 is circular so that flange 12 is annular. The cup 20 and plate 24 are circular in the preferred embodiment. The front face of flange 22 of cup 20 is flat and parallel to plate 11. The lug 15 on plate 14 provides a handle or support means to connect the vacuum cup to an apparatus.

The cup 20 has been made of rubber with a durometer hardness value between 40 and 45. The plates 11 and 24 were cold-rolled steel.

The vacuum cups of the present invention have been used successfully in the cutting apparatus described above. The vacuum cups successfully resist the shear forces. The vacuum cups have a substantially longer life than the cups previously used, i.e., it was not necessary to replace the vacuum cups of this invention as frequently as the other vacuum cups were replaced.

The rear face of lip 23 is preferably in the plane of the rear face of disc portion 21 of cup 20.

Various modifications of the present invention will be apparent to one skilled in the art from the foregoing description of the preferred embodiment which is presented only for purpose of illustration and not by way of limitation. The invention is limited only by the claims which follow.

Figure 3:
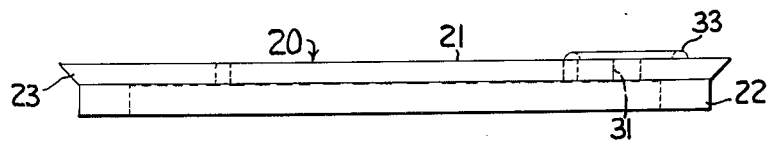
FIG. 3 is an elevation of the flexible cup of the vacuum cup.

In the foregoing description FIG. 1 is referred to as a plan and FIG. 3 as an elevation because the vacuum cup of this invention is so disposed on a carriage of the glass cutting apparatus with flange 12 extending downwardly from plate 11. However, the detailed description states that flange 12 is forwardly extending. Obviously the latter language is used to provide a specific reference point and is used in the claims, not by way of limitation, but merely to make clearer the structural relationship of the various components of the vacuum cup of the invention.

We claim:

1. A vacuum cup having a rigid plate with an integral peripheral forwardly extending flange, said flange having an inner wall recessed adjacent to said plate to provide a tapered groove between said flange and said plate, a cup of a flexible material having a disc portion, a peripheral forwardly extending flange and a peripheral lip extending laterally from said disc portion, said lip being tapered and positioned in said tapered groove to provide a rear face of said cup against a front face of said plate, a second rigid plate abutting the front face of said disc portion of said cup, means mounting said second rigid plate on said first-mentioned plate with said disc portion of said flexible cup between said plates, and a handle mounted on the rear face of said first-mentioned plate, said plates and said disc portion of said cup having aligned apertures.

2. The vacuum cup of claim 1 wherein said plates are circular metal plates, wherein the disc portion, flange and lip of the flexible cup are circular and wherein the tapered groove is circular.

3. The vacuum cup of claim 2 wherein said handle is a lug mounted on the rear face of first-mentioned plate and said lug has a pair of apertures normal to and communicating with each other and parallel to the rear face of said first-mentioned plate and wherein one of said apertures is threaded.

4. The vacuum cup of claim 3 wherein the rear face of said disc portion of said flexible cup has an annular rib around the aperture in said disc portion.

5. The vacuum cup of claim 1 wherein the rear face of said tapered lip is in the plane of the rear face of the disc portion of said flexible cup.

6. The vacuum cup of claim 5 wherein the rear face of said disc portion of said flexible cup has an annular rib around the aperture in said disc portion.

7. The vacuum cup of claim 6 wherein said flexible cup is made of rubber having a durometer hardness value between about 40 and 45.

References Cited in the file of this patent

UNITED STATES PATENTS

| | | |
|---|---|---|
| 1,512,831 | Dunnell | Oct. 21, 1924 |
| 2,274,212 | Persons | Feb. 24, 1942 |
| 2,765,996 | Anderson | Oct. 9, 1952 |